US006591267B1

(12) United States Patent
Chen

(10) Patent No.: US 6,591,267 B1
(45) Date of Patent: Jul. 8, 2003

(54) SYSTEM AND METHOD FOR CONSUMPTION VIA NETWORK

(75) Inventor: Chih-Min Chen, Taipei (TW)

(73) Assignee: PCYI Network Corp., Taipei (TW)

(*) Notice: Subject to any disclaimer, the term of this patent is extended or adjusted under 35 U.S.C. 154(b) by 284 days.

(21) Appl. No.: 09/688,242

(22) Filed: Oct. 16, 2000

(30) Foreign Application Priority Data

May 17, 2000 (TW) ....................................... 89109402 A

(51) Int. Cl.[7] ................................................ G06F 17/30
(52) U.S. Cl. ............................................ 707/10; 705/27
(58) Field of Search .............................. 707/10; 705/26, 705/27; 380/242; 709/201, 223

(56) References Cited

U.S. PATENT DOCUMENTS 5,956,716 A * 9/1999 Kenner et al. ................ 707/10
5,970,473 A * 10/1999 Gerszberg et al. ............ 705/26
6,115,471 A * 9/2000 Oki et al. .................... 380/242

* cited by examiner

*Primary Examiner*—Jean M. Corrielus
*Assistant Examiner*—Gwen Liang
(74) *Attorney, Agent, or Firm*—Birch, Stewart, Kolasch & Birch, LLP

(57) ABSTRACT

A method for consumption via a network that simultaneously provides a plurality of consumption activities for the user to select from and presents the selected consumption activity result in a predetermined form to the user. The method further registers the selected consumption activity as a paid consumption activity of the user so that the user does not need to pay again when the user again uses the paid consumption activity. The invention also provides a system for consumption via a network according to the method.

13 Claims, 3 Drawing Sheets

| Astrology | | Horoscope | | Name Analysis | |
|---|---|---|---|---|---|
| Today's Luck | USED | Personality | UNUSED | Simple Analysis | USED |
| Love Affair | USED | Friends | UNUSED | Detailed Analysis | USED |
| Year Fate | USED | Family | USED | | |
| | | Health | USED | | |
| | | Wealth | UNUSED | | |
| | | Love Affair | USED | | |

FIG. 3

SYSTEM AND METHOD FOR CONSUMPTION VIA NETWORK

BACKGROUND OF THE INVENTION

1. Field of Invention

The invention pertains to a method and system for consumption via a network and, more particularly, to a method and system in which the user does not need to pay again for a previously paid consumption activity.

2. Related Art

Since using the network to transmit information has the advantages of high speed and low cost, the exchange of information has become more and more facilitated along with the development of all kinds of networks. Accordingly, a new type of purchase method, i.e. real-time service over the network has formed to instantly provide users with the information they need after they make a payment.

Take a commonly seen network magazine as an example. If a user wants to obtain the information contained in a network magazine, he has to first register as a subscriber of the magazine and pay a subscription fee before he can access the magazine. This not only allows the user to quickly obtain the needed information through a network, but also saves the printing and packaging costs. The subscription fee can thus be lowered.

Another type of network purchase is when the user makes a payment to participate in a specific activity, such as fortune telling or downloading patent data. Since these consumption activities are carried out over a network, the user can instantly obtain the desired result of said activities and the cost is much lower than when performed in conventional ways. This is another model of providing a real-time service via a network.

However, the above-mentioned consumption methods have the following problems.

First, the user may not be interested in all the information or activities provided by the service provider. For example, the user may only need a few articles in each issue of the above-mentioned network magazine but he is forced to pay the full price for the whole issue. This greatly lowers the user's desire to subscribe. The service provider will never know which articles in the issue are the most interesting to readers unless the users give some feedback or comments.

Furthermore, after the user performs some consumption activities, he will be charged again if he wants to use the service again. From the viewpoint of the user, he will not want to be charged again for the same service that he has paid for before. The user's desire to use the same service will thus be lowered. Also, since the user pays again for the same consumption activity, he has to download the activity results from the service provider and storing them by himself. Thus, the user has to spend extra time in downloading, saving and storing information.

Moreover, if the service provider provides the consumption activity using the World Wide Web (WWW) over the Internet, one way the service provide profits is dependent upon how many times users click on the advertisement banners in the website. If the service provider wants to increase the number of times the user clicks on the advertisements, the number of users has to be first increased. However, usually the service provider can only provide limited services or activities. Once the user has used most of the consumption activities, he will not go to the website again. This lowers the number of times that users click on the advertisements in the website, thus lowering the profit of the website.

Since once the user has used most of the consumption activities on the website, he will not connect to the website any more. The user will not know of any new services or activities on the website. The service provider has to spend extra money in notifying users or to advertise the information somewhere else. This increases the cost and wastes resources.

In view of the foregoing, how to effectively provide users the information or services they need so that the users can consume in the most economical way and are willing to connect to the service provider again is an urgent issue to be solved.

SUMMARY OF THE INVENTION

Accordingly, it is an object of the invention to provide a method and system for consumption via a network. Using the method and system, the user pays only for the activities he really needs and does not need to pay again for a consumption activity and the user is therefore more willing to use the service and the service provider can continuously attract users. This in turn increases the profits of the service provider and allows the service provider to know of the user's interest according to his consumption activities.

It is another object of the invention to provide a method and system for consumption via a network which helps a user to manage and store the consumption activity results and to minimize network bandwidth waste, disk space and data download and storage time.

To achieve the above objectives, the method for consumption via a network simultaneously provides a plurality of consumption activities for a user to select from and presents the selected consumption activity results in a predetermined form to the user. The selected consumption activities are then registered as paid consumption activities of the user so that the user does not need to pay again for the same activities he has already paid for.

Another embodiment of the invention is a system for consumption via a network. The system comprises a memory device, a transmission device, a reception device and a consumption activity processing device, wherein the memory device stores a user database, the transmission device provides a plurality of consumption activities for a user to select from, the reception device receives the selection action performed by the user among the plurality of consumption activities, and the consumption activity processing device obtains basic data needed for carrying out the consumption activity from the user database to complete the consumption activity and registers the performed consumption activity as a paid consumption activity in the user database so that the user does not need to pay for the same consumption activity again.

BRIEF DESCRIPTION OF THE DRAWINGS

The invention will be described with reference to the accompanying drawings, wherein:

FIG. 3 is a schematic view showing the application condition of.the method and system for consumption via a network according to a preferred embodiment of the invention.

In the various drawings, the same references relate to the same elements.

DETAILED DESCRIPTION OF THE INVENTION

Figure 1:
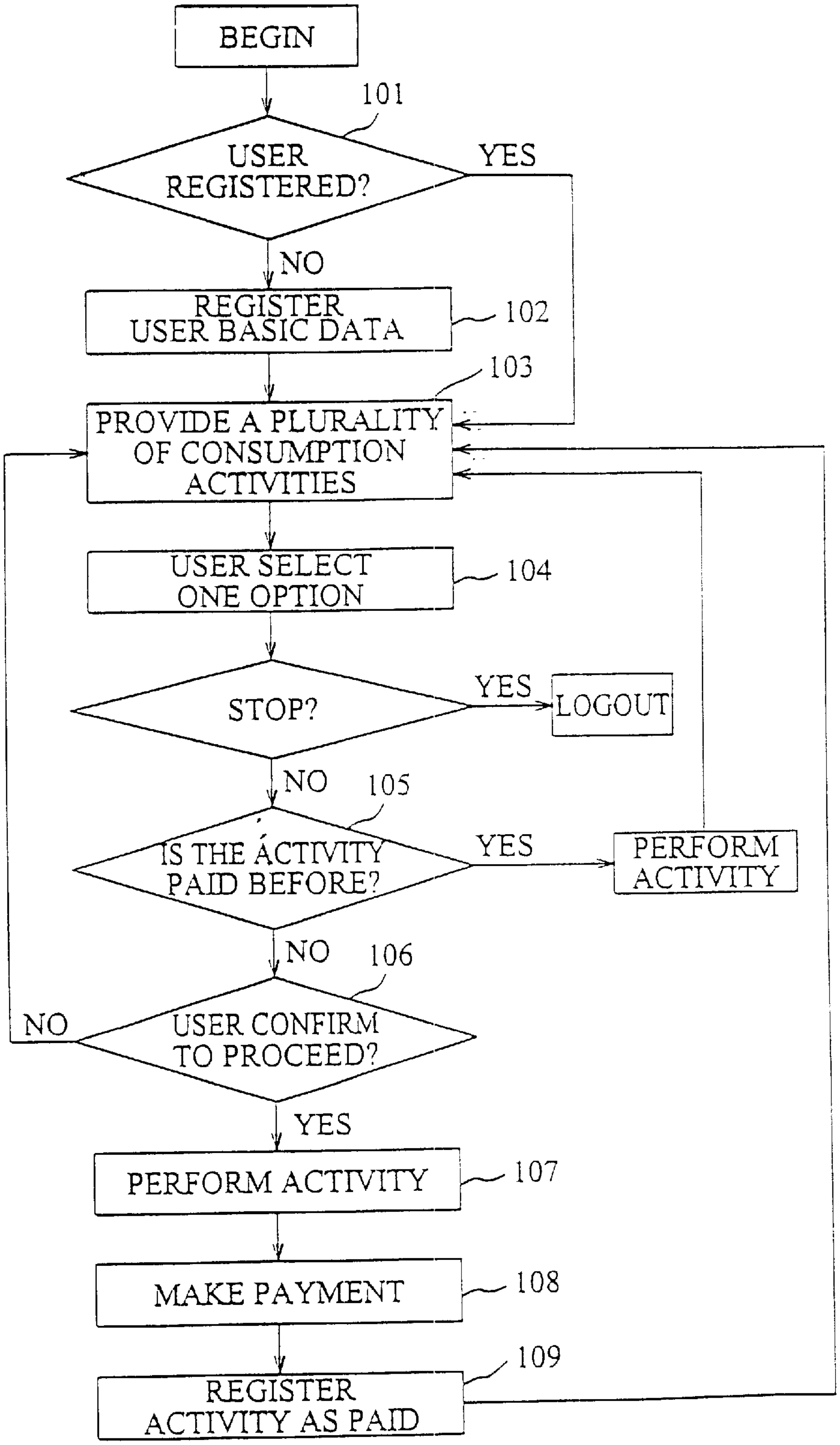
FIG. 1 is a flow chart showing the method for consumption via a network according to a preferred embodiment of the invention.

Referring to FIG. 1, the method for consumption via a network 1 first performs a check of data registration in step 101 to ensure that a user has registered his basic data. If the user is not registered, the method then performs step 102, asking the user to register his basic data before going to the next step.

The contents of the basic data includes at the minimum the data that can identify the user, such as username and password, so that the consumed activities performed by the user can be registered as paid consumption activities of the user. The basic data can also include necessary data for completing the consumption activity. For example, if the user wants to use his credit card for the payment, then the basic data should include the user's credit card number. If the user chooses to purchase a certain amount of "points" first and redeem the points toward a purchase, then the basic data should include the user's remaining points. Further, if the user wants to use a horoscope service for fortune telling, the basic data should include data such as the user's birthday.

One advantage of registering the user's basic data first is that the user needs only to select the consumption activity he wants without the need to reenter the basic data. This can greatly increase the efficiency of performing consumption activities and the user's willingness to make purchases. Furthermore, because the user does not need to repeatedly enter his basic data, the data will not be transmitted over the network, greatly lowering the risk of the basic data being intercepted.

Once the user has registered his basic data, the invention provides options in step 103 to display a plurality of consumption activities for the user to select from. For example, if the service provider provides the user a website with many different types of fortune telling services, then the service provider can display the various services, as shown in FIG. 3. If the service provider provides the user an electronic database with many types of data, then the classified contents of the database can be shown on the screen.

In the option-providing step 103, other content can be included at the same time the plurality of consumption activities is displayed. For example, a summary of each consumption activity can be provided for the user to roughly understand the content of each service. Also, a plurality of free consumption activities can be provided for the user to try. This not only allows the user to conveniently select the consumption activities he likes, but also encourage consumption.

In the option acceptance step 104, the user can use, for example, a mouse or any other means to select the consumption activity he wants. The user can also first choose a certain class of categories and then select a particular activity under that category. For example, the user can first choose to perform a horoscope or Yin and Yang and Five Elements fortune telling activity and then select a prediction for a love affair or future wealth.

In the option acceptance step 104, the user can select to logout. If the user does not choose to logout in the options, step 105 checks to see if the user has paid and whether the chosen activity is a paid consumption activity. If it is not a paid consumption activity, then a confirmation step 106 is performed. If it is a paid consumption activity, then the activity is performed in step 107.

After the confirmation step 106, the service provider notifies the user that he has to pay before participating in the activity and confirms that the user wants to continue. If the user agrees to pay, he then moves on to step 107, the activity; otherwise the user is returned back to the option-providing step 103 which allows the user to re-select on option. The user can thus avoid unnecessary payments due to incorrect selections.

If the consumption activity selected by the user is a paid consumption activity, or the user is confirmed in step 106, then the user proceeds to step 107. For example, if the user wants to read a document, then the selected document is presented to the user. If the user wants to execute a program, then the selected program runs for the user in this step.

In step 107, the service provider obtains the user basic data for performing the consumption activity accordingly. For example, if the user wants to use a horoscope service, then the user's birthday is needed for the information regarding his constellation. The service provider then obtains the user's birthday accordingly. If the user has previously registered his basic data, then the service provider can directly obtain the information in step 107 without asking the user to re-enter said data. If the user has not registered the basic data yet or the basic data registered by the user does not contain the necessary data for performing the consumption activity, then the service provider can inquire about the user relevant information in order to continue the activity.

The result of the user selected consumption activity is then presented in a predetermined form. For example, the result is displayed as an image on a display device (such as a computer or a cellular phone), in the form of sound (such as a voice service or an MP3 sound clip), in the form of files (such as downloadable image files or zipped files), or in the form of texts (such as fax) to the user.

If this is the first time the user performs such a consumption activity, then the service provider proceeds to step 108 for payment from the user for the service. After step 108, the consumption activity is recorded as a paid consumption activity in step 109. This record is used for determining whether the user selected activity is a paid consumption activity in step 105 later on. Finally, the service provider returns to the option-providing step 103 for the user to select any other activity he wants. As described above, if the newly selected activity is a paid one, the there is no need to go through steps 108 for payment and the step 109 for storing the record. Once the activity is performed in step 107, the user is sent directly back to the option-providing step 103.

It is noted that when the user selected consumption activity is considered a paid consumption activity, the record is not necessarily stored in the same database that stores the basic data. In other words, the user consumption activity records and the user basic data can be stored in different databases if necessary.

Figure 2:
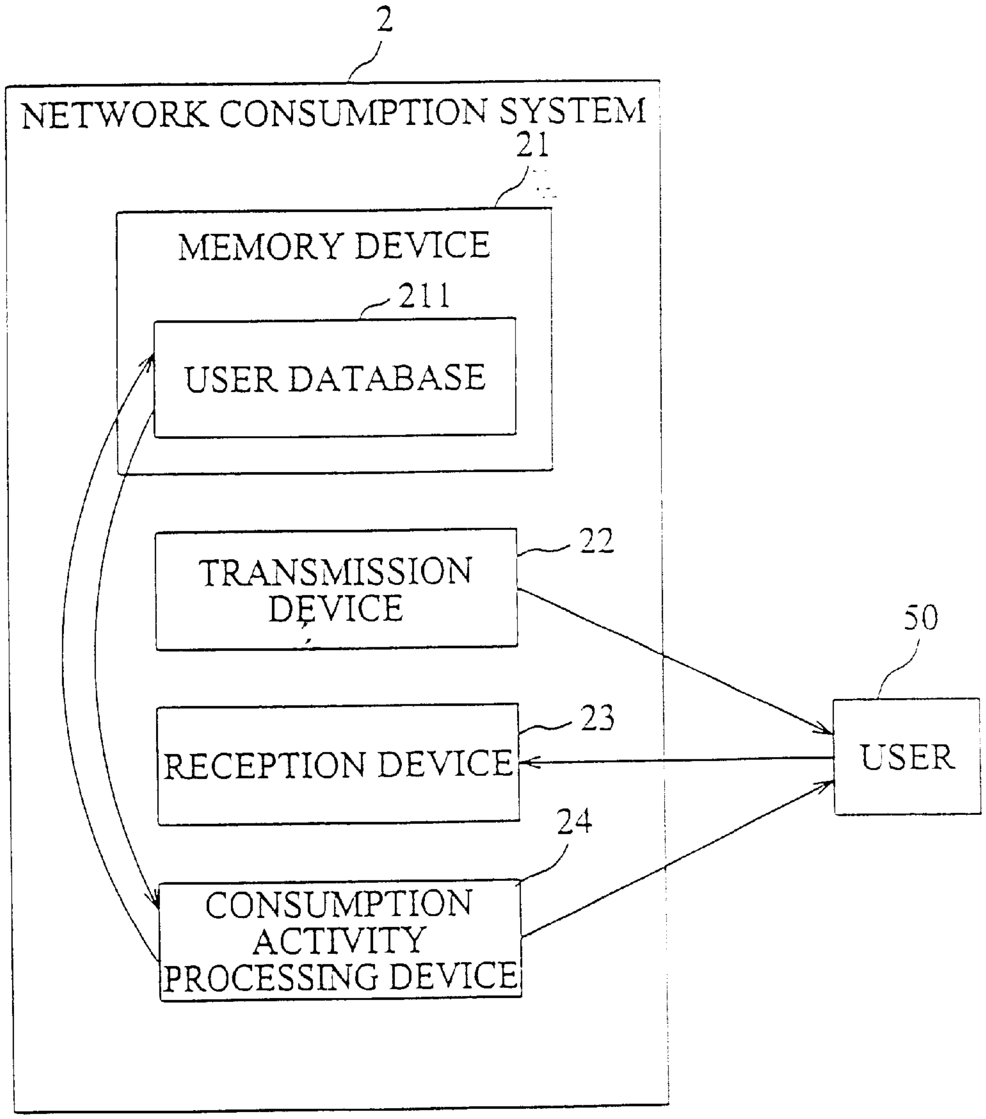
FIG. 2 is a schematic view showing the relationship between the system for consumption via a network and the user according to a preferred embodiment of the invention.

As shown in FIG. 2, a preferred embodiment of the system for consumption via a network 2 comprises a memory device 21, a transmission device 22, a reception device and a consumption activity processing device 24 for providing a user 50 many different types of services. The operation of all elements in the network consumption system 2 is described in further detail hereinafter.

The memory device 21 stores a user database 211 for performing consumption activities. As mentioned hereinbefore, the basic data of the user 50 stored in the user database 211 comprises at least the data that can identify the user 50. If the user 50 has previously registered his basic data in the user database 211, then the user 50 needs only to select the consumption activities he wants without re-entering the basic data each time. If the registered data regarding the user 50 are not complete, he will be asked to enter unprovided basic data during the activity and the data are stored in the user database 211. In such way, the basic data about the user 50 can become more and more complete for all activities. In addition, the user database 211 also stores information about what services have been used by the user 50.

The transmission device 22 provides the user 50 a plurality of consumption activities for the user to select from. For instance, if the user 50 uses a computer and connects to the network consumption system 2 through the Internet, then the transmission device 22 transmits signals that can be displayed on a computer display so that the user 50 can see all consumption activity options on the display. Also, if the user connects to the system 2 using a phone, then the transmission device 22 transmits voice options for the user 50 to select the consumption activities he wants by pressing buttons on the phone.

When the transmission device 22 transmits options, it also allows the user 50 to clearly see which consumption activities have been paid for and which have not. Therefore, the user 50 can easily know which services have been used without memorizing or storing the records himself, which effectively saves the user's time in managing the service records. For example, if the service provider provides a news website on the Internet, then different colors or additional texts and symbols are attributed to read and unread news by the user when displaying options on a computer display. At the same time, most of the information in the news website has been grouped according to the fields, thus the system can display read information according to its category for the user 50. So the user 50 does not need to manage the news that he has read himself.

The reception device 23 receives the selection from the user. The consumption activity processing device 24 obtains the basic data needed for the activity from the user database 211 in order to complete the service and registers the activity as a consumed and paid activity of the user 50. Thus, the user 50 does not need to pay again for the same service.

It should be understood that once the consumption activity is completed, the way the result is transmitted to the user 50 is not necessarily the same as the one adopted for transmitting options by the transmission device 22. For instance, if the user 50 uses a computer and connects to the network consumption system 2 via the Internet, then the transmission device 22 transmits the signals that can be shown on-the computer display so that the user 50 can view all consumption activity options on the display. When the system transmits the result of an activity, however, the result can be directly downloaded to the user's computer or be faxed to the user 50 in addition to appearing on the computer display.

As shown in FIG. 3, when the network consumption method and system are applied to a website that provides fortune telling services on the Internet, the website can have all available services shown on the user's computer display, already classified for the user to select from. Beside each selection item it is also marked whether the option has been used or not, corresponding to paid or unpaid services, respectively. For example, in the category of name analysis, it can be briefly remarked that this service is already paid before and is free for the user, or that this service is not paid yet for and the user has to pay first before using the service.

In FIG. 3, options of all fortune telling activities are already classified, so if the user has registered his basic data he can perform all activities by simply clicking on the options, which greatly saves time for the user.

According to the network consumption method and system of the invention, the user can select the consumption activities he needs without paying for all information provided by the service provider. Thus, the user can spend a minimal amount of time to obtain the information that interests him the most. The service provider can also determine and learn the interests and needs of the user according to the activities consumed by the user so as to improve or enhance the service content and thereby attract more users.

According to the network consumption method and system of the invention, the user will not be recharged for services already paid for thereby increasing the user purchases In addition, if the user wants to repeatedly obtain the same information, he needs only to click on the same item and will not be charged again. Since all data are already grouped and classified, the user does not need to spend extra time in managing the information.

According to the network consumption method and system of the invention, the way of performing consumption activities is fairly simple. After the user enters the basic data, he can enjoy a variety of services at the same time by simple clicks of the mouse. Therefore, the service provider can continuously attract the user's web hits.

The network consumption method and system of the invention can continuously attract users; therefore, the user can immediately know of the newly added activities or services provided by the service provider. The service provider does not need to spend extra money to notify users or to advertise at other places. This can greatly save network resources and management cost.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A network consumption method comprising:

an option-providing step of simultaneously providing a plurality of consumption activities for a user to select from in such a manner that the user is allowed to clearly distinguish between which ones of the consumption activities have once been paid for and which ones of the consumption activities have never been paid for;

an option acceptance step of selecting one of the consumption activities to be performed;

a first activity performing step of performing the selected one of the consumption activities without charging the user again if the selected one of the consumption activities has once been paid for;

a confirmation step of notifying the user that a first time payment is necessary if the selected one of the consumption activities has never been paid for;

a second activity performing step of performing the selected one of the consumption activities if the selected one of the consumption activities has never been paid for and is confirmed by the user for making the first time payment; and a recording step of registering the selected one of the consumption activities as a has-once-been-paid-for consumption activity if the first time payment has been made by the user for the selected one of the consumption activities which has never been paid for.

2. The system according to claim 1, wherein the consumption activities include performing a fortune telling activity.

3. The method according to claim 1, further comprising a data registration step before the option-providing step to register the user's basic data into a user database.

4. The method according to claim 3, wherein, during the first and second activity performing steps, the basic data of the user is necessary for completely performing the selected one of the consumption activities.

5. The method according to claim 3, wherein, during the recording step, the selected one of the consumption activities is registered in the user database as a has-once-been-paid-for consumption activity.

6. The system according to claim 1, wherein the consumption activities include reading news information.

7. The system according to claim 1, wherein the consumption activities include downloading a file.

8. A network consumption system comprising:

a memory means for storing a user database including basic data of a user;

a transmission means for providing a plurality of consumption activities for the user to select from in such a manner that the user is allowed to clearly distinguish between which ones of the consumption activities have once been paid for and which ones of the consumption activities have never been paid for;

a reception means for receiving a selection action from the user for selecting one of the consumption activities to be performed; and a consumption activity processing means for performing the selected one of the consumption activities without charging the user again if the selected one of the consumption activities has once been paid for, notifying the user that a first time payment is necessary if the selected one of the consumption activities has never been paid for, performing the selected one of the consumption activities if the selected one of the consumption activities has never been paid for and is confirmed by the user for making the first time payment, and registering the selected one of the consumption activities as a has-once-been-paid-for consumption activity if the first time payment has been made by the user for the selected one of the consumption activities which has never been paid for.

9. The system according to claim 8, wherein the consumption activities include reading news information.

10. The system according to claim 8, wherein the consumption activities include activities include downloading a file.

11. The system according to claim 8, wherein the consumption activities include performing a fortune telling activity.

12. The system according to claim 8, wherein the consumption activity processing means obtains the basic data of the user from the user database for completely performing the selected one of the consumption activities.

13. The system according to claim 8, wherein the selected one of the consumption activities is registered in the user database as a has-once-been-paid-for consumption activity.

* * * * *